Patented Apr. 13, 1937

2,076,949

UNITED STATES PATENT OFFICE 2,076,949

NEW PRODUCT AND PROCESSES FOR PRODUCING SAME

James E. Kirby, Wilmington, Del., assignor to E. I. du Pont de Nemours & Company, Wilmington, Del., a corporation of Delaware No Drawing. Application November 2, 1931, Serial No. 572,739

9 Claims. (Cl. 18—58)

This invention relates to processes for treating synthetic latices, and to products prepared by such processes. More particularly the invention pertains to the use of dipping methods for the production of formed articles from latices containing halogen-2-butadiene-1,3 polymers.

Prior art

It has been discovered, as disclosed by Carothers and Collins in application #490,538, filed October 22, 1930, now U. S. Patent No. 1,950,431, that hydrogen halides such as hydrogen chloride and hydrogen bromide may be made to combine with monovinylacetylene under suitable conditions with the formation of chloro-2-butadiene-1,3 and bromo-2-butadiene-1,3 respectively. By way of illustration, they described the formation of chloro-2-butadiene-1,3 by passing monovinylacetylene into an aqueous solution containing hydrochloric acid, cuprous chloride, and ammonium chloride, the two last-named compounds acting in conjunction as a preferred catalyst for the reaction. They further showed, as described and claimed in application #519,243, filed February 28, 1931, now U. S. Patent No. 1,950,432, that chloro-2-butadiene-1,3 may be polymerized under a variety of conditions, e. g., by the use of elevated temperature and/or elevated pressure, air, oxidizing catalysts, and light, to yield products closely resembling vulcanized natural rubber in their physical properties. It was further shown by Williams in application #519,244, filed February 28, 1931, now U. S. Patent No. 1,950,436, that other polymers of chloro-2-butadiene-1,3 can be prepared by stopping the polymerization before it goes to completion, and while the polymers are still plastic, which polymers possess the properties of unvulcanized natural rubber, may be utilized and fabricated in the same way, and finally converted by heat into products closely resembling vulcanized natural rubber. It has been further shown by Collins in application #537,484, filed May 14, 1931, now U. S. Patent No. 1,967,861, that chloro-2-butadiene-1,3 is readily emulsified in water and, after polymerization in this state, yields an artificial latex from which a material very similar to natural vulcanized rubber may be obtained by coagulation or evaporation. Finally it has been discovered by Carothers and Collins as disclosed and claimed in application #537,492, filed May 14, 1931, now U. S. Patent No. 1,950,433, that bromo-2-butadiene-1,3 may be subjected to the processes of the above cited applications, yielding polymers very similar to those of chloro-2-butadiene-1,3 already described. While the rubber-like products obtained by complete polymerization either in emulsion or in mass or by heating the plastic polymers of the type discovered by Williams very closely resemble vulcanized natural rubber in most of their physical and mechanical properties, they are in certain respects markedly superior. For example, they are only very slightly swelled by aliphatic hydrocarbons such as gasoline, and are much more resistant than natural rubber to the action of ozone.

It has been proposed in numerous patents to prepare articles of natural rubber by coagulation or other means directly from natural rubber latex. In order for these articles to have the necessary strength, however, they must invariably be subjected to the step of vulcanization, which may be applied either to the uncoagulated latex or to the formed rubber article after coagulation. This step of vulcanization, in addition to making the process of manufacture of the rubber articles more lengthy and more expensive, also introduces sulfur or similar compounds which in general darken the product, produce an unpleasant odor and taste, and also cause tarnishing of certain metals such as copper and silver in contact with the rubber. In addition to these objections, freshly coagulated natural rubber is very weak and consequently thread, ribbons, and thin sheets prepared therefrom require special care in handling before vulcanization.

Objects of the invention

Objects of this invention are therefore to provide a method for the production of articles directly from artificial latices prepared from halogen-2-butadiene-1,3, e. g., chloro-2-butadiene-1,3 and bromo-2-butadiene-1,3 and to produce formed articles which have the desirable properties of natural vulcanized rubber, and are in addition light in color, free from objectionable taste and odor, have no tarnishing action, and furthermore are highly resistant to swelling by such substances as gasoline, and highly resistant to deterioration by agents such as ozone. A further object of the invention is to provide for the manufacture of formed elastic articles directly from artificial latices by processes which do not require vulcanization or the introduction of sulfur or sulfur compounds and in which the freshly coagulated rubber is not easily damaged. A specific object of the invention relates to the preparation of formed articles by dipping a preshaped form into a synthetic latex, withdrawing the form and coagulating the coating of latex. Other objects of the invention will be disclosed in the following description of the invention.

Description of the invention

A dispersion of polymerized chloro- or bromo-2-butadiene-1,3, hereafter referred to as synthetic latex, is subjected to conditions which bring about the separation of the rubber-like polymer from the liquid phase of the dispersion in the form of elastic articles of the desired shape. This is accomplished in accordance with the teachings of the present invention by dipping a form having the shape and size corresponding to that which it is desired that the final product assume, into a latex of halogen-2-butadiene-1,3 polymer, withdrawing the form slowly from the latex and coagulating the coating of latex either by allowing the film to dry at ordinary or elevated temperature or by dipping the form into a suitable coagulating bath, washing and drying the film or coating, and then stripping it from the mold. In order to obtain smooth and uniform coatings by this process, it is necessary to observe certain precautions, since simple latices prepared from halogen-2-butadiene-1,3 sometimes fail to wet solid surfaces uniformly. This difficulty may be overcome in the process of the present invention by various methods. Thus, it has been found that if the concentration of the latex is such that it contains more than 55% by weight of polymerized halogen-2-butadiene-1,3 it wets solid objects readily and forms uniform continuous films. The same object, namely, the modification of the latex so as to make it capable of wetting solid objects uniformly and producing uniform, continuous films, can be accomplished by adding to the latex small amounts, e. g., .2 to 2% of protective colloids such as polyvinyl alcohol and especially of proteins, such as casein or glue. When this method is used it is not necessary to have the latex more concentrated than 55% and, indeed, latices of any desired concentration may be used.

Example 1

Formation of articles by dipping followed by coagulation

A synthetic latex containing 57–60% of polymerized chloro-2-butadiene-1,3 and made as described in Example B below is applied to a form (made, for instance, of glass or glazed porcelain or polished wood) by dipping the form in the latex and withdrawing it slowly and at an even speed. The coating of latex is then coagulated by dipping in a coagulating bath such as a mixture of one volume of ordinary concentrated hydrochloric acid and four volumes of ethyl alcohol or by exposing to a coagulant, such as hydrogen chloride in the vapor phase or a saturated solution of sodium chloride. After washing off the excess of coagulant with water, an additional layer of the polymer may be applied over the first by a repetition of the same procedure. This is continued until the desired thickness is obtained. The coagulated material is then dried on the form and finally stripped.

The coagulation may be assisted, if desired, by maintaining the coagulating bath at elevated temperature which is above room temperature and below the boiling point of the coagulating medium. The coagulation may likewise be assisted by maintaining the coated form at a similar elevated temperature either before or during deposition of the latex on the form.

Formed objects may also be formed by alternate and repeated dippings in separate dispersions of chloro-2-butadiene-1,3 polymer and vulcanized or unvulcanized natural rubber or other synthetic rubber.

Example 2

Use of acid latex

The above procedure may be varied as follows: A layer of the alkaline latex used in Example 1 is applied as above and then dipped into an acidic latex made as described in Example C below. Mutual coagulation of the acid and alkaline latices results. This process of adding first a layer of alkaline, then a layer of acid latex may be continued until the desired amount of material is deposited. The coating is then dried and removed as described above.

Instead of using a glazed form as in Examples 1 and 2, the form may be coated with paraffin before dipping in the latex, or the form may be composed entirely of paraffin or some other low melting material such as Wood's metal. The adhering coagulated layer may then be readily removed by warming to soften the paraffin, or other low melting material. In all cases the latex may be applied to the form by spraying or other means instead of dipping.

Articles of varying shapes may be made by this method. For instance, tubing may be made by repeatedly dipping twine which is coated with paraffin into the latex and coagulating after each immersion. After drying, the finished tube may be readily removed. Sheets may be made by forming a coating upon a cylindrical mold and then cutting it longitudinally.

Example 3

Formation of articles by dipping followed by evaporation

Instead of coagulating the successive coats of latex as in the preceding example, the polymer may be precipitated in continuous form by allowing the water to evaporate at either ordinarily or elevated temperatures. Multiple layers of the polymers may be readily built up in this way if the dried coat of polymer is first wet with a wetting agent such as an aqueous solution of a salt of an isopropyl naphthylene sulfonic acid to assist the wetting of the dried polymers by the succeeding coat of latex.

Example 4

Removal of water by suction

Formed articles may also be prepared by dipping porous molds in the synthetic latex and then removing the water by applying suction to the interior of the mold or pressure to the exterior and thereby withdrawing the water from the latex layer until a layer of the desired thickness has been built.

A latex suitable for use in the application of the present invention may be prepared as follows:

Example A

Preparation of standard latex

Four hundred grams of water containing 8 g. of dissolved sodium oleate is rapidly stirred by means of a mechanical stirrer and 400 grams of chloro-2-butadiene-1,3 is then added slowly with constant stirring. A homogeneous emulsion results. This emulsion is then maintained at 10° C. for 48 hours or until the polymerization of the chloro-2-butadiene-1,3 is substantially complete. The resulting pure white, fine dispersion of polymerized chloro-2-butadiene-1,3 is treated with 16 g. of ordinary concentrated ammonium hydroxide solution and then with 4 g. of phenyl-beta-naphthylamine which is first dispersed in water by grinding in a ball mill with sodium oleate solution. The resulting compounded dispersion is strained thru a fine cloth to remove any large solid particles and is then ready for use.

It is usually more desirable to use a latex more concentrated than that of Example A. Such a latex may be prepared as follows:

Example B

Preparation of concentrated latex

The procedure of Example A is followed exactly except that 600 g. instead of 400 g. of chloro-2-butadiene-1,3 is added to 400 g. of 3% sodium oleate solution and 21 g. of ammonium hydroxide and 6 g. of phenyl-beta-naphthylamine are used.

Alternately a concentrated latex is made from the standard latex prepared above by removing water by distillation with constant stirring and preferably in a stream of nitrogen or other non-oxidizing gas until the desired concentration has been brought about.

An acid latex satisfactory for use in the process of Example 2 may be prepared as follows:

Example C

Preparation of acid latex

One-half gram of casein is dissolved in 26 g. of glacial acetic acid and 65 g. of water. Twenty-three grams of chloro-2-butadiene-1,3 is then dispersed in this solution in the same manner as in the sodium oleate solution used in the preparations above. In about two days the polymerization is complete and a latex, similar in appearance to those described above, results.

An acid latex which may also be used in the process described in Example 2 may be made from the standard latex by adding to 100 grams of the latex 5 g. of gelatin dissolved in 100 g. of water and then adding enough acetic or sulfuric acid to cause the latex to turn Congo test paper blue.

In addition to the dispersion described above, a great variety of latices may be used satisfactorily in the practice of this invention. Thus any of the latices disclosed in Collins U. S. application #537,484, cited above, may in general be used. These latices include those prepared under high pressure and at temperatures above 10° C. and those in which alkalies, catalysts, inhibitors of polymerization, and solvents for the chloro-2-butadiene-1,3 are present during the polymerization. Under the classification of solvents are included volatile solvents such as benzene, softeners such as those used in the rubber and nitrocellulose arts, and substances which are themselves capable of polymerization such as isoprene, styrene, and vinyl acetate. Furthermore, as disclosed in the above cited application, other modifying agents such as proteins, pectins, and water-soluble resins may be added either before or after the polymerization of the chloro-2-butadiene-1,3. Dyes, pigments, and fillers of the type used in rubber compounding may similarly be dispersed with the chloro-2-butadiene-1,3 before its polymerization or may be added afterwards. The synthetic latex may also be mixed with natural rubber latex or similar aqueous dispersions. Unusually strong and tear-resistant articles may be obtained if salts of water-soluble alkyd resins, that is, synthetic resins formed by partial esterification of a polybasic acid with a polyhydric alcohol which may also be partly esterified by other acids, are used as dispersing agents instead of the sodium oleate specified in the above descriptions of the preparation of the synthetic latex. Unusually pliable products may be obtained if a small quantity, for instance 1–2%, of dichloro-2,3-butadiene-1,3 is added to the chloro-2-butadiene-1,3 before polymerization, as disclosed in the copending application of Carothers and Berchet, Serial No. 589,052, filed January 26, 1932, now U. S. Patent No. 1,965,369. Stiffer products, which are desirable for some purposes are made from the standard latex described above. Still stiffer products are made by first incorporating proteins, especially glue, into the latex.

As has been disclosed in U. S. application #537,484, the addition of certain inhibitors of polymerization, such as iodine, to the chloro-2-butadiene-1,3 before emulsification brings about formation under certain conditions of a dispersion of a plastic polymer. Such dispersions, which resemble natural rubber latex very closely, may be used in the practice of the present invention to yield variously formed articles composed of plastic synthetic rubber. Since this plasticity is retained for long periods, such articles may be subjected to further molding or coalescing operations long after their preparation. Hence, the plastic material thus obtained by coagulation is more applicable to certain manufacturing operations than is the elastic, fully cured polymer which has already been described and which is plastic and cohesive for only a short time after its coagulation. The plastic articles obtained by coagulation or other means may be converted to the elastic non-plastic insoluble state by heating, preferably in the presence of curing agents, such as zinc oxide, which may be incorporated by dispersion in water and mixing with the dispersion of polymer before the latter is coagulated.

It is desirable in all cases to prevent the oxidation of the synthetic rubber articles by the addition of antioxidants of the type used with natural rubber. I have found phenyl-beta-naphthylamine to be one of the best of these for my purpose. The antioxidant is incorporated by dispersion in water and addition in this form to the latex before its conversion into formed articles. It may also be incorporated into synthetic rubber articles after their manufacture by soaking them in a solution of the antioxidant followed by drying. It is also advantageous to have present in the synthetic rubber articles some substance to combine with traces of hydrogen chloride which are sometimes evolved from the rubber on long standing. Such substances are bases or substances capable of combining with acids. Zinc oxide has been found useful for this purpose.

As coagulants, acids, or salts dissolved in water, or in neutral liquids which are miscible with water, for example ethyl alcohol and acetone may be used. Small concentrations (2% or less) of even weak acids such as acetic acid, are sufficient for coagulation, while higher concentrations of salts are necessary, for example, that present in a saturated aqueous solution of sodium chloride. Nonaqueous solvents and concentrated salt solutions exhibit a dehydrating effect on the coagulum in addition to the coagulating action.

Some of the preferred coagulants are the following:

| | Percent |
|---|---|
| Formic acid in acetone | 10 |
| Zinc chloride in alcohol | 10 |
| Calcium chloride in alcohol | 10 |
| Ordinary concentrated hydrochloric acid in alcohol, saturated solution of sodium chloride in water | 10 |

In addition to the advantages discussed above, the molded articles prepared according to this invention are unexpectedly much stronger than those obtained from natural latex and stronger than articles of polymerized chloro-2-butadiene-1,3 or bromo-2-butadiene-1,3 prepared by other methods. Furthermore, the method of the present invention for the formation of articles by dipping and coagulation is much simpler than that to which natural latex must be subjected, in that the synthetic latex need not be concentrated, its coagulation and setting is much more rapid, may be accomplished at room temperature by means of a great variety of coagulating media and the resulting articles have considerable strength, even immediately after coagulation, and are consequently much more readily subjected to further operations.

The above examples have been directed specifically to the treatment of latices of chloro-2-butadiene-1,3 polymer. The invention is likewise applicable to the similar treatment of latices of other halogen-2-butadiene-1,3 polymers, e. g., bromo-2-butadiene-1,3 polymer, the slightly different conditions necessary for the treatment of the latter latex being easily determinable by simple experiment in the light of the present invention.

It should be pointed out that it is by no means obvious that the synthetic latices described herein would behave similarly to natural rubber latex, since it differs from the latter in many respects; for example its particle size is much smaller, in general it contains no proteins or resins, and its particles are composed of solid polymer rather than a semi-fluid interior surrounded by a thin sack as is believed to be the case with natural rubber latex. Furthermore, it is quite unexpected that the freshly precipitated material should remain temporarily plastic and cohesive. The much greater wet strength freshly coagulated chloro-2-butadiene-1,3 polymer compared with that of freshly coagulated natural rubber could not be foreseen. Furthermore, the great strength of the dried coagulated polymer as compared with that of chloro-2-butadiene-1,3 polymer prepared by other methods is entirely unexpected.

The above description and examples are illustrative only and are not to be construed as limiting the scope of the invention. Any variation therefrom which conforms to the spirit of the invention is intended to be included within the scope of the claims.

I claim:
1. In the process for the preparation of shaped articles from synthetic latex, the steps which comprise dipping a form of predetermined size and shape into a body of a synthetic latex comprising more than 55% by weight of dispersed chloro-2-butadiene-1,3 polymer, then withdrawing the form slowly and at an even speed from the body of the latex, thereby retaining a coating of latex on the form and removing the dispersing medium from said coating.

2. In the process for the preparation of shaped articles from synthetic latex, the steps which comprise dipping a form of predetermined size and shape into a body of a synthetic latex composed of a dispersion of chloro-2-butadiene-1,3 polymer, containing not less than 0.2% and not more than 2.0% of a protective colloid, then withdrawing the form slowly and at an even speed from the body of the latex, thereby retaining a coating of latex on the form and removing the dispersing medium from said coating.

3. The process of claim 2 further characterized in that the colloid is a protein.

4. The process of claim 1 further characterized in that the concentration of polymer in the body of latex is 57 to 60%.

5. The process of claim 1 further characterized in that the concentration of polymer in the body of latex is above 55%.

6. In the process for the preparation of shaped articles from synthetic latex, the steps which comprise dipping a smooth-surfaced form into a body of an alkaline synthetic latex, the dispersed phase of which latex comprises 57 to 60% by weight of substantially completely polymerized chloro-2-butadiene-1,3 polymer, said latex also comprising 1% by weight, based on the polymer, of phenyl-$\beta$-naphthylamine, then withdrawing the form slowly and at an even speed from the body of the latex, thereby retaining a coating of latex on the form, dipping the form in a coagulating bath composed of substantially 1 volume of concentrated hydrochloric acid and 4 volumes of ethyl alcohol, then washing off the coagulant with water, repeating the dipping, coagulation and washing steps until a coating of the desired thickness is obtained, drying the coating and thereafter removing it from the form.

7. The process of claim 1 further characterized in that the synthetic latex contains about 1% by weight, based on the polymer, of phenyl-$\beta$-naphthylamine and a subsantial amount of zinc oxide.

8. The process of claim 2 further characterized in that the synthetic latex contains about 1% by weight, based on the polymer, of phenyl-$\beta$-naphthylamine and a substantial amount of zinc oxide.

9. The process of claim 2 further characterized in that the colloid is casein.

JAMES E. KIRBY.

CERTIFICATE OF CORRECTION.

Patent No. 2,076,949.   April 13, 1937.

JAMES E. KIRBY.

It is hereby certified that error appears in the printed specification of the above numbered patent requiring correction as follows: Page 2, second column, line 48, for "ordinarly" read ordinary; and page 4, second column, line 28, claim 5, for the numeral "1" read 2; and that the said Letters Patent should be read with these corrections therein that the same may conform to the record of the case in the Patent Office.

Signed and sealed this 29th day of June, A. D. 1937.

(Seal)

Henry Van Arsdale
Acting Commissioner of Patents.